United States Patent
Eichler et al.

(10) Patent No.: US 9,777,693 B2
(45) Date of Patent: Oct. 3, 2017

(54) METHOD AND DEVICE FOR CONTROLLING THE OPERATION OF AN INTERNAL COMBUSTION ENGINE OF A PORTABLE WORK DEVICE

(71) Applicants: MAKITA CORPORATION, Aichi (JP); PRUEFREX ENGINEERING E MOTION GMBH & CO. KG, Cadolzburg (DE)

(72) Inventors: Enrico Eichler, Hamburg (DE); Harry Radel, Geesthacht (DE); Thomas Voss, Bad Schwartau (DE); Marek Lajda, Fuerth (DE); Nikolai Reimgen, Zirndorf (DE)

(73) Assignees: MAKITA CORPORATION, Aichi (JP); PRUEFREX ENGINEERING E MOTION GMBH & CO. KG, Cadolzburg (DE)

( * ) Notice: Subject to any disclaimer, the term of this patent is extended or adjusted under 35 U.S.C. 154(b) by 0 days.

(21) Appl. No.: 14/654,143

(22) PCT Filed: Dec. 19, 2013

(86) PCT No.: PCT/EP2013/077446
§ 371 (c)(1),
(2) Date: Jun. 19, 2015

(87) PCT Pub. No.: WO2014/096225
PCT Pub. Date: Jun. 26, 2014

(65) Prior Publication Data
US 2015/0345460 A1 Dec. 3, 2015

(30) Foreign Application Priority Data
Dec. 21, 2012 (DE) .................. 10 2012 112 948

(51) Int. Cl.
*F02P 5/04* (2006.01)
*B25F 5/00* (2006.01)
(Continued)

(52) U.S. Cl.
CPC ........... *F02P 5/04* (2013.01); *B25F 5/00* (2013.01); *F02N 11/10* (2013.01); *F02P 5/1506* (2013.01);
(Continued)

(58) Field of Classification Search
CPC .... F02P 5/04; F02P 5/1506; F02P 5/1508; F02P 1/00; F02N 11/10; F02N 15/026; B52F 5/00; Y02T 10/46
See application file for complete search history.

(56) References Cited

U.S. PATENT DOCUMENTS 5,050,553 A 9/1991 Erhard
6,212,879 B1 * 4/2001 Nishimura .......... F02D 41/0255
123/406.54

(Continued)

FOREIGN PATENT DOCUMENTS

DE 3914026 9/1990
DE 202005020147 5/2007
(Continued)

OTHER PUBLICATIONS

International Search Report (ISR) in International Patent Application No. PCT/EP2013/077446, dated Mar. 25, 2014.

*Primary Examiner* — Hieu T Vo
*Assistant Examiner* — Sherman Manley
(74) *Attorney, Agent, or Firm* — Greenblum & Bernstein, P.L.C.

(57) ABSTRACT

The invention relates to a method and a control device for operating an internal combustion engine of a portable work device, said method having the following method steps: a)
(Continued)

storing a starting ignition curve for specifying an ignition time after a startup time of the internal combustion engine and an operating ignition curve for specifying the ignition time in a speed range assigned to the nominal operation of the internal combustion engine, b) reading the current engine speed, c) reading at least one time value which indicates the time that has elapsed since a reference time, wherein the reference time can relate to the startup time of the internal combustion engine, and d) determining and/or initiating a switchover process from the starting ignition curve to the operating ignition curve on the basis of the current engine speed and the time value.

14 Claims, 7 Drawing Sheets

(51) Int. Cl.
F02N 11/10 (2006.01)
F02P 5/15 (2006.01)
F02N 15/02 (2006.01)
F02P 1/00 (2006.01)

(52) U.S. Cl.
CPC ............... F02N 15/026 (2013.01); F02P 1/00 (2013.01); F02P 5/1508 (2013.01); Y02T 10/46 (2013.01)

(56) References Cited

U.S. PATENT DOCUMENTS

| 2005/0145217 | A1* | 7/2005 | Takama | F02D 31/008 123/339.11 |
| 2008/0022958 | A1* | 1/2008 | I | F02D 41/0002 123/179.3 |
| 2008/0163851 | A1* | 7/2008 | Kolossow | F02N 3/02 123/406.54 |
| 2008/0223339 | A1* | 9/2008 | Carlsson | F02P 9/005 123/406.54 |
| 2010/0147544 | A1* | 6/2010 | Yoshizaki | F02D 11/04 173/176 |
| 2012/0297631 | A1* | 11/2012 | Kunert | F02P 5/1504 30/381 |
| 2014/0096986 | A1 | 4/2014 | Hirabayashi et al. | |
| 2014/0096987 | A1 | 4/2014 | Hirabayashi et al. | |
| 2014/0096988 | A1 | 4/2014 | Hirabayashi et al. | |
| 2015/0345460 | A1* | 12/2015 | Eichler | B25F 5/00 701/113 |

FOREIGN PATENT DOCUMENTS

| DE | 102009054116 | 9/2010 |
| DE | 102009036372 | 2/2011 |
| WO | 2007/004936 | 1/2007 |

* cited by examiner

METHOD AND DEVICE FOR CONTROLLING THE OPERATION OF AN INTERNAL COMBUSTION ENGINE OF A PORTABLE WORK DEVICE

The invention relates to a control device and a method for controlling the operation of an internal combustion engine of a portable work device.

Portable, hand-operated and engine-driven working machines or work devices, such as for example chainsaws, angle grinders and cutting devices, are independent of the provision of a network current or generator current, and consequently are to this extent autonomous. Thus, when for example a chainsaw is used in forestry or a cutting device has to be used at the scene of a traffic accident, usually no power supply network is available. On account of the high power consumption of such engine-driven work devices, the use of batteries or other energy storage units is similarly ruled out.

For this reason it is customary for such work devices, such as chainsaws or angle grinders, to be equipped with an internal combustion engine (such as for example a smaller version of a petrol engine), the use of which is virtually unlimited in terms of location and is only limited in terms of time by the volume of the tank of the internal combustion engine.

Safety considerations lead to hand-operated, portable work devices of the type mentioned being equipped with centrifugal clutches, which only engage as from a predetermined rotational speed of the internal combustion engine, in order only thereafter to transmit a torque generated by the internal combustion engine to an implement of the work device, for example the saw chain in the case of a chainsaw. On account of the half-throttle speed that is absolutely required for so-called cold starting, the rotational speed or the engine speed after the starting process is much greater than the driver speed of a mechanical coupling, with the consequence that the implement likewise rotates. This may lead to a risk of injury during the starting phase, which must absolutely be avoided.

PRIOR ART

A portable work device with an internal combustion engine and also with a centrifugal clutch is known for example from the document DE 10 2009 036 372 A1. The internal combustion engine drives via the clutch an implement which is driven above the coupling speed. For operating the internal combustion engine, the combustion chamber is fed a fuel-air mixture, which is ignited by a control unit by way of a spark plug. Also provided is a starting device for starting the internal combustion engine, which feeds an enriched starting mixture to the internal combustion engine in an operating position. In order to ensure that the speed does not increase above the coupling speed of the clutch in the starting process, the starting device is provided with means for detecting the operating position. In dependence on a status signal of the operating position detection, the control unit limits the speed of the internal combustion engine to a value below the coupling speed. The status signal of the operating position detection is used exclusively for controlling the speed of the internal combustion engine of the machine.

To increase the safety of the work device, it is also known from DE 10 2009 054 116 A1 in the course of a self-stabilizing running state with a quickly rising engine speed initially to introduce a non-igniting control mode and subsequently to execute it when the engine speed reaches or exceeds the value 4500 rpm, a centrifugal clutch only engaging at a speed of 5000 rpm. Also in the case of this known work device, only a conventional control is realized for limiting the engine speed.

The prior art described above only realizes a conventional control for limiting the engine speed. However, the potential within the time that has elapsed since the starting process remains ignored. In particular, the prior art ignores the fact that the time of the beginning of the starting process and the beginning of the time measurement do not necessarily coincide.

SUMMARY OF THE INVENTION

Problem, Solution, Advantages

The invention addresses the problem of improving the control of the operation of an internal combustion engine of a portable work device. It is also intended in particular to increase safety.

This problem is solved with respect to the control device by the features of claim 1 and with respect to the method by the features of claim 10. Advantageous designs, developments and variants are the subject of the respectively dependent subclaims.

According to the invention, the engine speed and at least one time value are read and evaluated. A switchover process from a starting ignition curve to an operating ignition curve is in this case realized on the basis of the current engine speed and at least one time value.

The invention is based here on the idea that the mechanism that is intended to prevent the co-rotation of the implement should be based on at least one condition that is as reliable as possible, and nevertheless can be easily realized, for the switching over of the ignition curve when an ignition curve for the starting and an ignition curve for the operating range are provided. The starting ignition curve undergoes a cut-off, preferably by means of an ignition timing retardation, in the upper idling speed range, and thereby prevents co-rotation of the implement. The switchover can therefore be carried out purely under software control, and consequently can be implemented in existing internal combustion engines, and thus in existing work devices, in a way that is neutral in terms of cost and easy.

A corresponding method for controlling an ignition time of an engine, also referred to as hereinafter as ignition timing, comprises the following steps:

a) storing a starting ignition curve for ignition timing after a startup time of the internal combustion engine, in particular in relation to the engine speed, and an operating ignition curve for ignition timing in nominal operation of the internal combustion engine, in particular likewise in relation to the engine speed, b) reading a current engine speed value or the current engine speed, c) reading at least one time value which indicates the time that has elapsed since a reference time, wherein the reference time relates to the startup time of the internal combustion engine, and d) determining a switchover process from the starting ignition curve to the operating ignition curve on the basis of the current engine speed value and the current engine speed and the time value.

A control device set up for this, for controlling the ignition time of the internal combustion engine, comprises a storing device and a reading device and also an evaluating determining device. The storing device is set up to store a starting ignition curve for specifying an ignition time after a startup time of the internal combustion engine and an operating ignition curve for specifying the ignition time in nominal operation of the internal combustion engine, in each case in particular in relation to the engine speed. The reading device is set up to read a current engine speed (engine speed value) and at least one time value. The time value specifies the time that has elapsed since a reference time, wherein the reference time relates to the startup time. The evaluating determining device is set up to determine and/or to initiate a switchover process from the starting ignition curve to the operating ignition curve on the basis of the current engine speed and the time value.

According to a development, the starting ignition curve preferably comprises a cut-off in the upper speed range of this starting ignition curve. In this case, the cut-off preferably takes place by means of an ignition timing retardation. Furthermore, the cut-off of the starting ignition curve preferably comprises a significant downward step of the ignition time in a region directly before reaching a maximum permissible engine speed during the starting of the internal combustion engine.

In a particularly suitable embodiment, at least the storing device and the reading device are implemented in a processor. The reference time here is preferably that time that follows the startup time and denotes the reaching of an engine speed that is suitable for supplying at least the processor with an operating current. In this case, the determining or evaluating device is preferably also set up to monitor whether the time value lies above a time threshold value, and whether the engine speed value or the current engine speed value lies below a speed threshold value.

The evaluating device is preferably also set up only to determine the switchover when both conditions are satisfied. Here, the time threshold value preferably defines an upper time limit that is required for increasing the engine speed to the speed threshold value. Furthermore, the time limit value preferably lies between 0 and 2000 ms.

The reading device may preferably also be set up to read a first time value and a second time value, wherein the evaluating device may then be set up to monitor whether the first time value lies above a first time threshold value and the second time value lies above a second time threshold value, wherein the evaluating device then only instigates the switchover when both conditions are satisfied.

It may then preferably be provided that the first time threshold value and the second time threshold value are variable independently of one another, in dependence on a temperature of the internal combustion engine.

The advantages achieved with the invention are, in particular, that the control device is completely set up on a software basis and in a programming sense for carrying out the method according to the invention. The control device in turn may be advantageously used in a hand-operated, portable work device or be comprised by a work device. The work device suitably has a drive shaft and a driven shaft of a power consumer, in particular an implement, and also a clutch. The latter is set up to transmit a torque from the drive shaft to the driven shaft, in particular in a gradual and controllable manner. In this case, advantageously only minimal modifications to an existing work device are required. The work device is particularly suitable as a chainsaw, as hedge shears or as an angle grinder, the method according to the invention and the device provided for carrying it out making it possible for the internal combustion engine, and consequently the work device, to be operated particularly safely.

BRIEF DESCRIPTION OF THE DRAWINGS

Exemplary embodiments of the invention are explained in more detail on the basis of a drawing, in which.

PREFERRED EMBODIMENTS OF THE INVENTION

Components of the control device are referred to hereinafter by their technical implementation, for example a processor or a nonvolatile memory, or by their general form, for example a reading device, a determining device or a storing device. However, the general form does not constitute a restriction to the specific technical implementation, but in each case only represents an exemplary embodiment. This similarly applies to specific numerical values and indications. As long as they are not technically necessary, they also merely represent an exemplary embodiment.

Figure 2A:
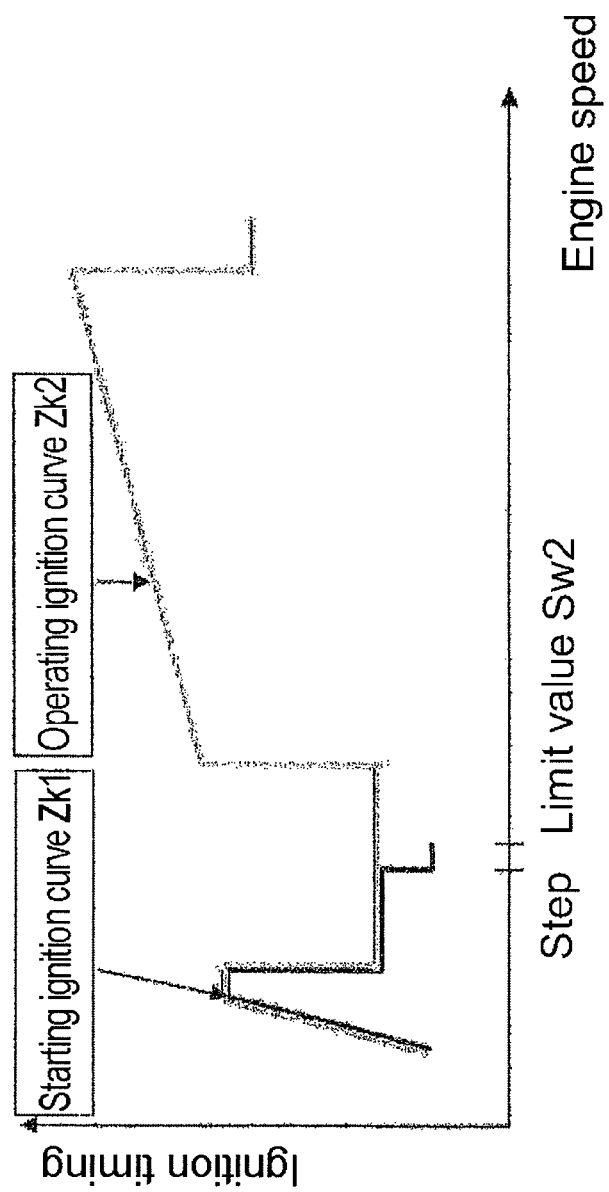
Figure 2B:
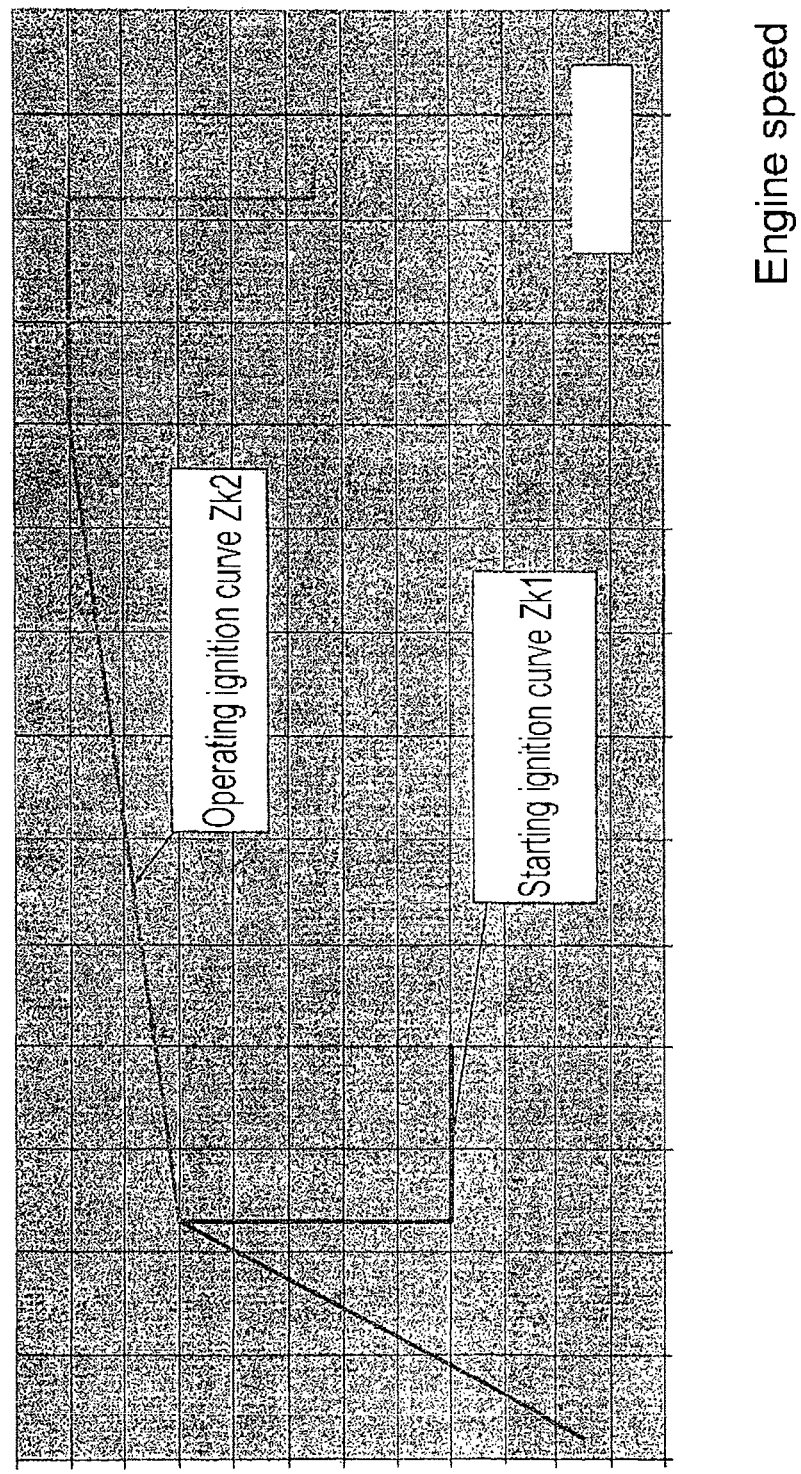
Figure 3A:
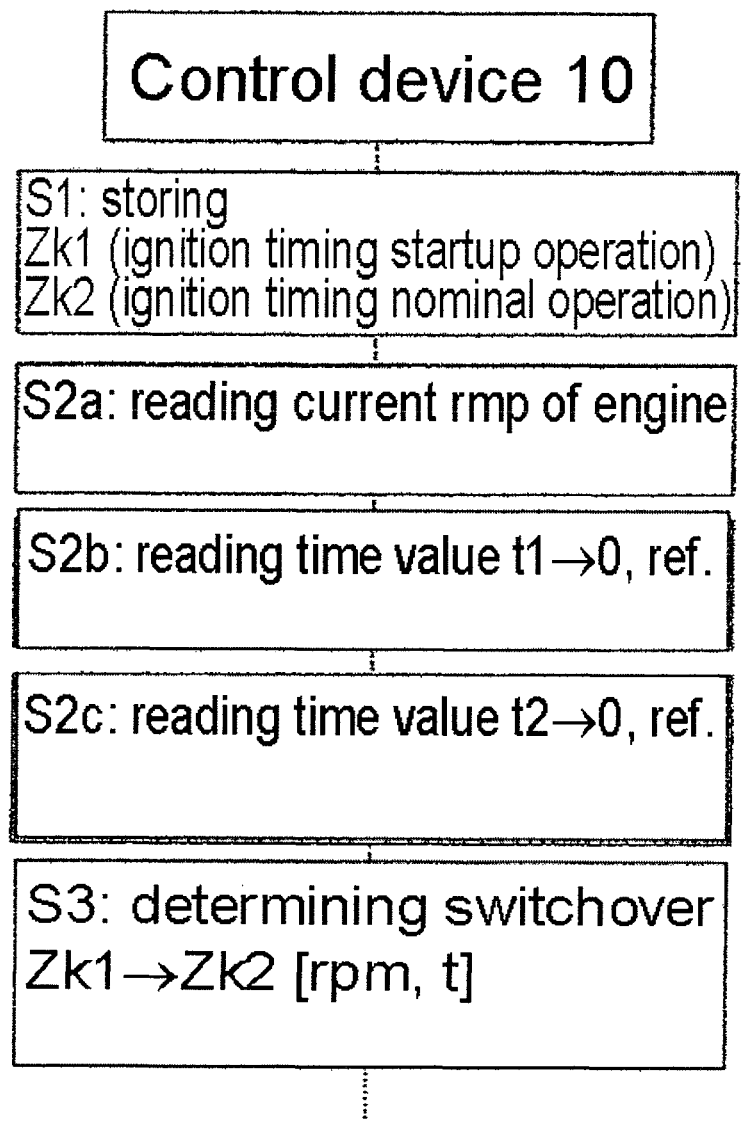
Figure 3B:
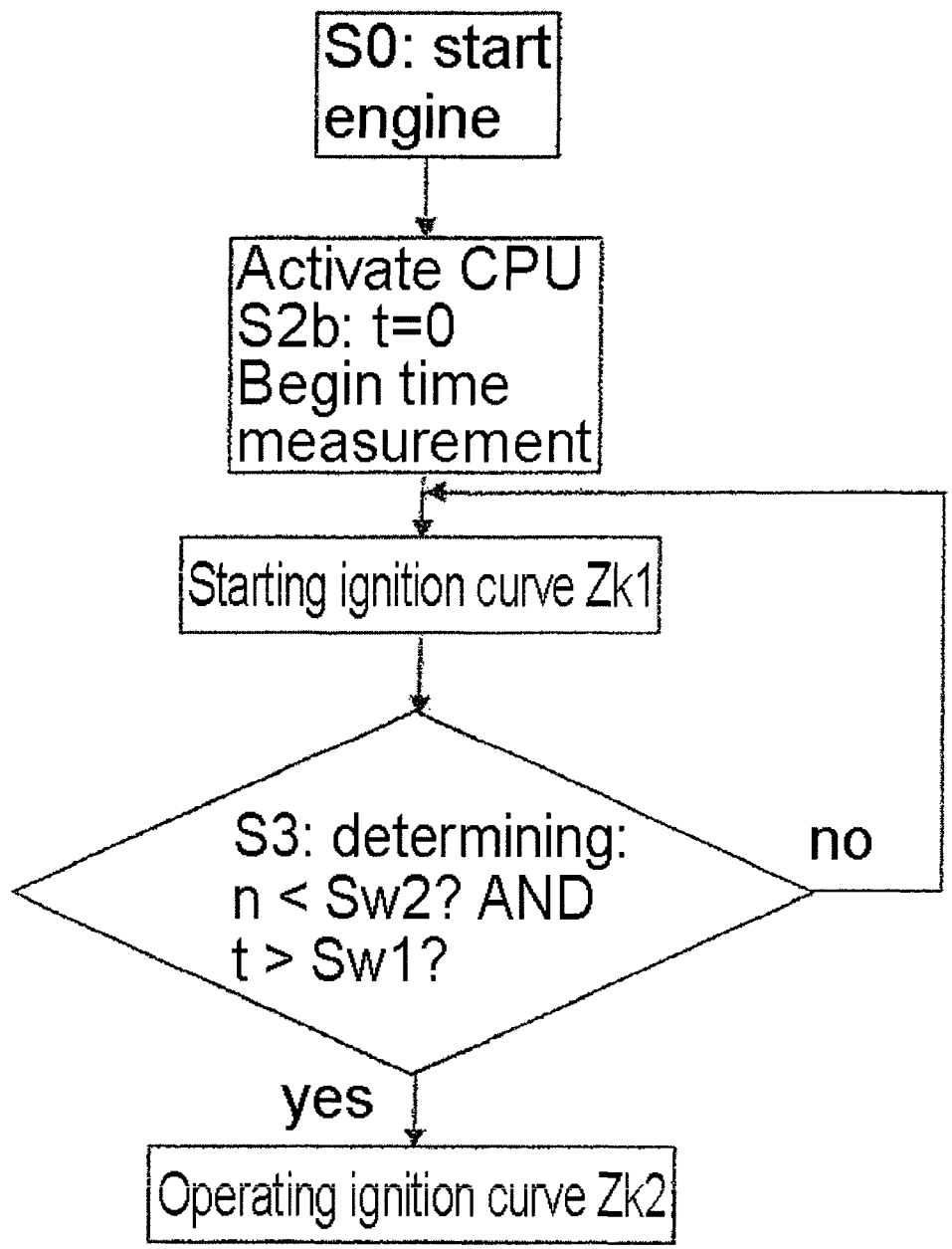
Figure 3C:
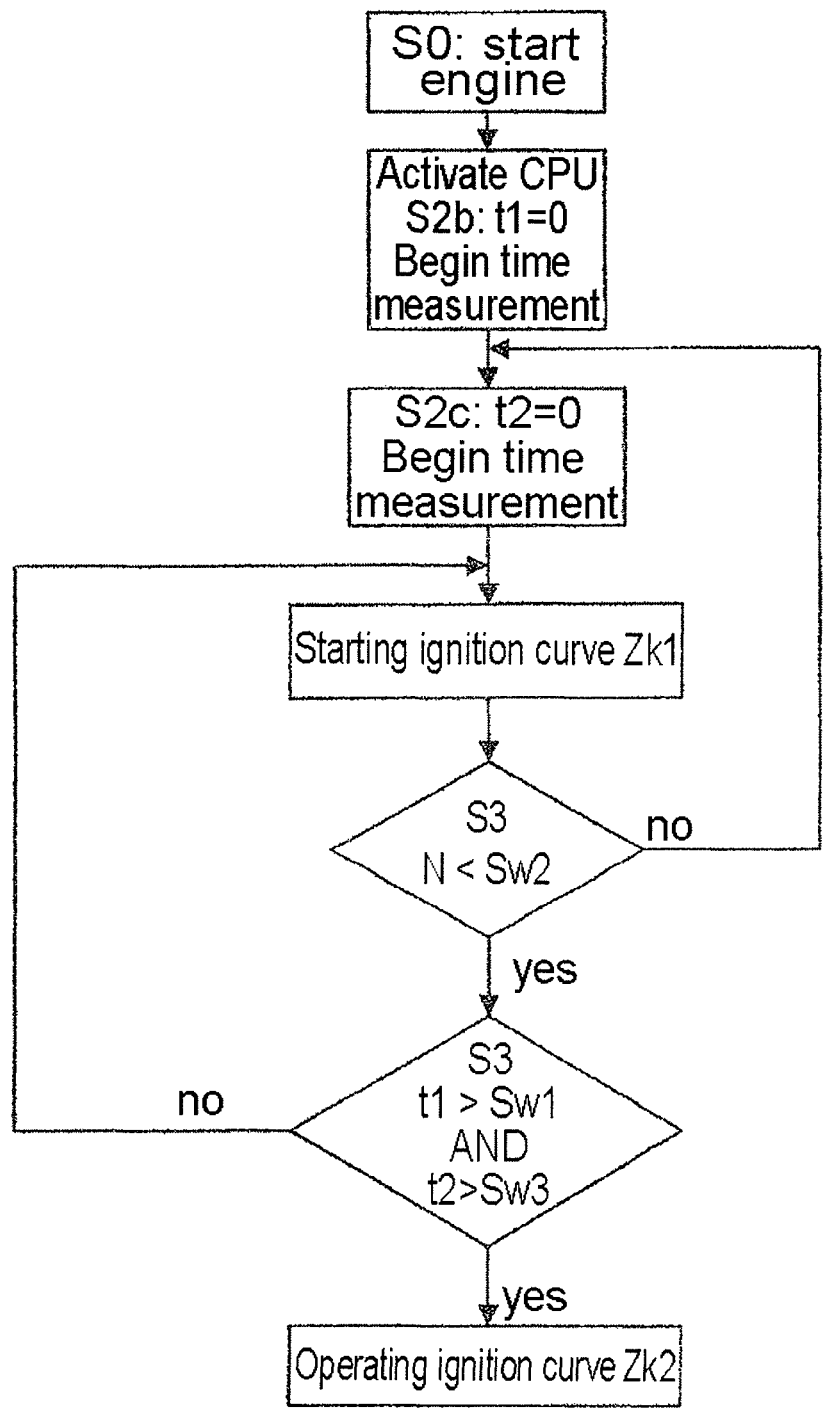

FIGS. 2A and 2B illustrate two different ignition curves, while the software algorithm that runs according to the invention or represents it is shown in FIGS. 3A, 3B and 3C. After the starting of the internal combustion engine, as from a certain rotational speed sufficient energy for supplying voltage to a processor (CPU) is present. After the "wakeup" of the CPU, the timer value t is equal to zero (t=0) and the time measurement is started.

During the starting process, the starting ignition curve Zk1 is preferably always active. A switchover to the operating ignition curve Zk2 only takes place when the engine speed or rotational speed lies below a speed threshold value Sw2 defined as a limit value and furthermore the timer value t has exceeded a first time threshold value Sw1 or a second time threshold value Sw3. The speed threshold value Sw2 lies below the driver speed of the clutch, whereby co-rotation of the implement is prevented.

The first time threshold value Sw1 defines the time that the internal combustion engine requires in the most unfavorable case to accelerate to the speed threshold value Sw2. This time may be between 0 and 2000 ms and differ according to the type of internal combustion engine. In addition, the second time threshold value Sw3 may be defined, this value being reset to 0 each time the speed threshold value Sw2 is exceeded, as is shown in FIGS. 3B and 3C. If the second time threshold value Sw3 is provided, switching over from the starting ignition curve Zk1 to the operating ignition curve Zk2 only takes place when the second time threshold value Sw3 is reached. The provision of the second time threshold value Sw3 is therefore particularly advantageous, since on very cold days the running behavior and the speed changes are very slow. Both time threshold values Sw1 and Sw3 may be variable in dependence on the temperature of the internal combustion engine. After the switchover of the starting ignition curve Zk1 to the operating ignition curve Zk2, the operating ignition curve preferably remains active until the internal combustion engine is stopped.

Figure 1:
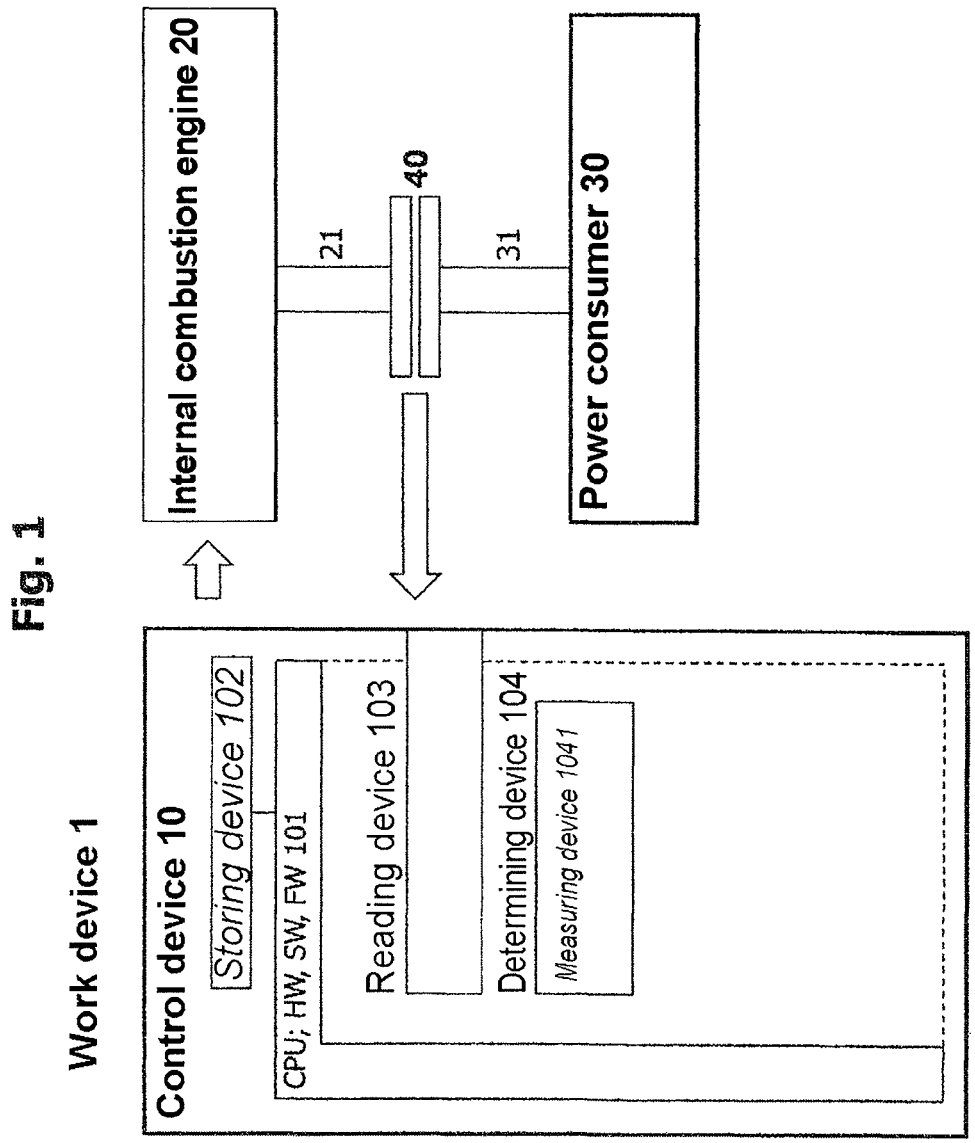
FIG. 1 shows a schematic representation of a portable work device with a control device in one embodiment, FIGS. 2A and 2B respectively show a diagram of a first example and a second example of a starting ignition curve and an operating ignition curve, FIGS. 3A, 3B and 3C respectively show an embodiment of the method and developments of the embodiment of the method of the control device.

FIG. 1 schematically shows a portable work device 1 and a control device 10 in one embodiment. The work device 1 comprises an internal combustion engine 20, which drives a drive shaft 21, a driven shaft 31, which is coupled with a power consumer 30, and a clutch 40. The latter is set up to transmit a torque from the drive shaft 21 to the driven shaft 31 in a gradual and controllable manner.

The clutch, schematically represented as a classic disk clutch, also includes the centrifugal clutch that is customary in the case of hand-operative, portable work tools 1. In principle, any type of clutch that is capable of substantially not transmitting the drive torque of the internal combustion engine 20 below a certain engine speed is suitable.

The control device 10 serves for controlling an ignition time of the work device 1 or its internal combustion engine 20. The control device 10, which is preferably implemented in a processor (CPU, Central Processing Unit), comprises a processing device 101, a storing device 102, a reading device 103 and an evaluating device 104, also referred to hereinafter as a determining device. The device 104 in turn preferably comprises a measuring device 1041. The control device 10, or its devices 101, 102, 103 and/or 104, may also be designed as hardware (HW), software (SW) or firmware (FW).

As shown by the extension of the processor 101 indicated by dashed lines in FIG. 1, the processor implements or represents at least one of the devices 103 and 104. In this case, the devices 103 and 104 may take the specific form of dedicated circuits or software modules, wherein any suitable technology and/or programming language that is suitable for implementing the devices 103 and 104 can be used.

The storing device 102 is suitably designed as a nonvolatile memory, which is capable of retaining stored contents even after switching off a power supply.

The storing device 102 is set up to store a starting ignition curve Zk1 with an ignition time of the internal combustion engine after a startup time of the internal combustion engine in relation to the engine speed and an operating ignition curve Zk2 with an ignition time in nominal engine operation in relation to the engine speed. The ignition curves Zk1 and Zk2 are described in more detail below with reference to FIGS. 2A and 2B.

The reading device 103 is set up to read a current engine speed or a corresponding engine speed value and at least one time value. The time value indicates the reference time in relation to the startup time of the machine. The reading device 103 may be both passively designed, for reading an externally measured values, and actively designed, the reading device 103 in the case of the active design being set up to measure the required values itself. This option is indicated by the extended box of the reading device 103.

The evaluating or determining device 104 is set up to determine and/or initiate a switchover process, i.e. a switchover from the starting ignition curve Zk1 to the operating ignition curve Zk2 on the basis of the current engine speed and at least one time value.

As described above, at least the storing device 102 and the reading device 103 are preferably comprised in the processor 101. In this case, the reference time is preferably the time that lies temporally after the startup time and denotes the reaching of an engine speed that is suitable for supplying at least the processor 101 with an operating current or an operating voltage. If appropriate, the beginning of the supply of current or voltage to the processor 101 determines the beginning of the time measurement.

FIG. 2A shows a diagram of a first example of a starting ignition curve Zk1 and an operating ignition curve Zk2. FIG. 2B shows a diagram of a second example of a starting ignition curve Zk1 and an operating ignition curve Zk2.

As shown in FIGS. 2A and 2B, the starting ignition curve Zk1 preferably comprises a cut-off in the upper speed range of the engine speed. This applies in particular before reaching a speed threshold value Sw2, which is preferably defined in such a way that is below a driver speed of the clutch 40.

To increase the safety, the cut-off of the starting ignition curve Zk1 may comprise a significant downward step of the ignition timing in the region directly before reaching the maximum permissible engine speed or rotational speed value Sw2, as shown in FIG. 2A. It can be ensured by the later ignition time in the region of the step that, even in the event of unexpected engagement of the clutch 40 as the result of a malfunction, no torque, or only a minimal torque, is transmitted by way of the driven shaft 31 to the power consumer 30, i.e. to an implement coupled with the internal combustion engine by way of the clutch.

As shown in FIG. 2B, the cut-off in the starting ignition curve Zk1 may comprise an ignition timing retardation, preferably in the region directly before reaching the speed threshold value Sw2 defined as a limit value. The speed threshold value Sw2 may for example lie at 4000 rpm, and the cut-off may begin for example at about 2300 rpm.

As can be seen from FIG. 2A, the operating time curve Zk2 may on the one hand take into account a desired or required safety aspect, in that the transition from the starting ignition curve Zk1 to the operating ignition curve Zk2 is carried out substantially without any sudden change in the ignition angle as the ignition time (ignition timing). As shown in FIG. 2B, the operating ignition curve Zk2 may on the other hand also give prominence to a desired power output aspect, in that the transition from the starting ignition curve Zk1 to the operating ignition curve Zk2 is carried out substantially with a sudden change in the ignition angle as the ignition time (ignition timing). The operating ignition curve Zk2 may establish a substantially linear relationship between the ignition angle and the rotational speed, as shown in FIGS. 2A and 2B. The operating ignition curve Zk2 may also enter saturation at an optimal ignition angle of for example 24°, as shown in FIG. 2B. Finally, the operating ignition curve Zk2 may itself comprise a cut-off, for example when reaching a nominal or maximum rotational speed of for example 12200 rpm, in order to avoid damage to the work device 1.

FIG. 3A shows an embodiment of the method of the control device according to the invention, and FIG. 3B and FIG. 3C show developments of the embodiment of the method.

In a step S1, the starting ignition curve Zk1 for the ignition timing of the internal combustion engine 20 after a startup time in relation to the engine speed and the operating ignition curve Zk2 for the ignition timing in nominal operation of the internal combustion engine 20 in relation to the engine speed are stored.

In a step S2a, the current engine speed value is read. In a step S2b, a first time value, which indicates a first time that has elapsed since a first reference time is read, wherein the first reference time can relate to the startup time of the internal combustion engine 20. In a then following step S2c, a second time value, which indicates a second time that has elapsed since a second reference time, is read.

In a step S3, a switchover from the starting ignition curve Zk1 to the operating ignition curve Zk2 is determined on the basis of the current engine speed value and the time values or a corresponding switchover process between the curves Zk1 and Zk2 is initiated.

As shown in FIG. 3B, in an initiating step S0, the internal combustion engine 20 is started, i.e. put into operation. As soon as the internal combustion engine 20 has reached a speed that allows or ensures current or voltage to be supplied to the processor 101, the processor 101 carries out a so-called wakeup process. After that, the time measurement is begun, and the ignition time of the internal combustion engine 20 is set to the starting ignition curve Zk1.

The device 104 is set up to monitor whether the time value lies above the time threshold value Sw1, and whether the machine speed value or the current machine speed lies below the speed threshold value Sw2. The device 104 is also set up only to determine or initiate the switchover process from the curve Zk1 to the curve Zk2 when both conditions are satisfied. As long as both conditions are not satisfied, the ignition time is continued with the starting ignition curve Zk1. Once both conditions are satisfied, the ignition time or the ignition timing is switched over to the operating ignition curve Zk2.

In FIG. 3C, a design that is an alternative to the embodiment shown in FIG. 3B is shown. Also in the case of the design shown in FIG. 3C, the internal combustion engine 20 is started, i.e. put into operation, in an initiating step S0. As soon as the internal combustion engine 20 has reached a speed that allows or ensures current or voltage to be supplied to the processor 101, the processor 101 carries out a so-called wakeup process. After that, a first time measurement for determining a first-time value and a second time measurement for determining a second time value are carried out. Subsequently, the ignition time of the internal combustion engine 20 is set to the starting ignition curve Zk1. In a then following step, it is checked whether the current engine speed lies below the speed threshold value Sw2. If this condition is not satisfied, the second time measurement is reset to 0 and started once again. If, however, the condition that the current engine speed lies below the speed threshold value Sw2 is satisfied, it is then checked whether the first time value determined in the first time measurement is greater than the first time threshold value Sw1 and whether the time value determined in the second time measurement is greater than the second time threshold value Sw3. If both conditions are satisfied, a switchover from the starting ignition curve Zk1 to the operating ignition curve Zk2 takes place. If, on the other hand, both conditions are not satisfied, or one of the two conditions is not satisfied, the ignition timing of the internal combustion engine 20 is reset again to the starting ignition curve Zk1.

As described above, the first time threshold value Sw1 preferably defines an upper time limit, which is required for increasing the engine speed to the speed threshold value Sw2. The time threshold value Sw1 may be between 0 and 2000 ms. The speed threshold value Sw2 is advantageously defined in such a way that it lies below a driver speed of the clutch.

Figure 4:
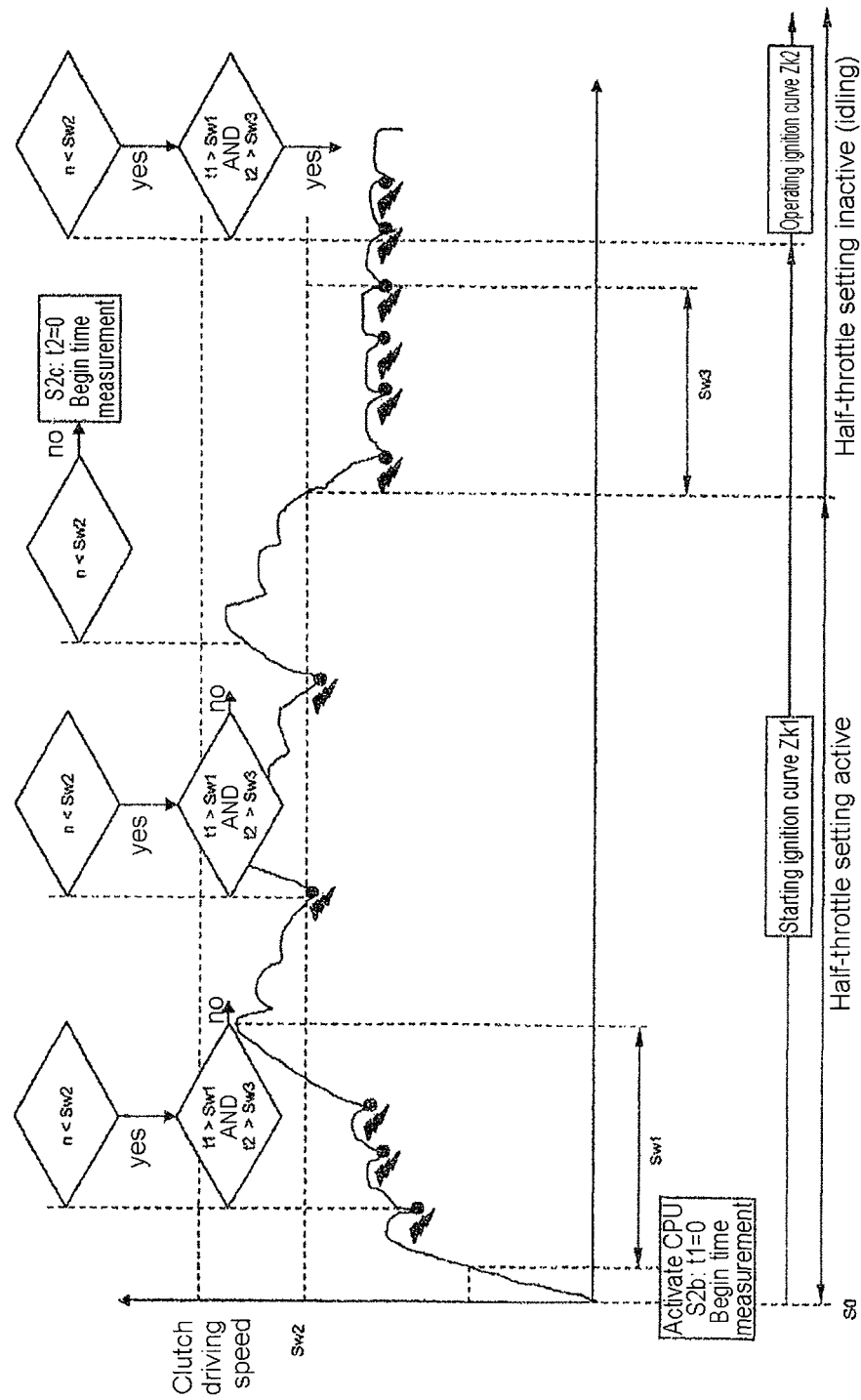
FIG. 4 shows a diagram of a speed profile over time.

This is also shown once again in FIG. 4. FIG. 4 shows a speed profile of the internal combustion engine 20 over time, corresponding to the embodiment shown in FIG. 3C. After the wakeup process of the processor 101, it is continuously checked whether the current engine speed is less than the speed threshold value Sw2. If this condition is satisfied, it is checked whether the first time value is greater than the first time threshold value Sw1 and whether the second time value is greater than the second time threshold value Sw3. As long as these two conditions are not satisfied, initially the current engine speed and the two time values are continuously checked. During the repetitions of this check, the ignition timing of the internal combustion engine 20 is set to the starting ignition curve Zk1. At this time, a half-throttle setting is active. If the half-throttle setting is switched over to inactive, the rotational speed is reduced to a substantially constant value, this value lying below the speed threshold value Sw2. If in a further check it is determined that the two time values are greater than the two time threshold values Sw1 and Sw3, the switchover from the starting ignition curve Zk1 to the operating ignition curve Zk2 takes place.

LIST OF REFERENCE SIGNS

1 Work device
10 Control device
101 Processor
102 Storing device
Zk1 Starting ignition curve
Zk2 Operating ignition curve
103 Reading device
104 Determining device
Sw1 Time threshold value
Sw2 Speed threshold value
Sw3 Time threshold value
20 Internal combustion engine
21 Drive shaft
30 Power consumer
31 Driven shaft
40 Clutch
S1 Storing step
S2a, S2b, S2c Reading steps
S3 Determining step

The invention claimed is:

1. A control device for operating an internal combustion engine of a portable work device, the control device comprising:
  a memory, in which a starting ignition curve for the internal combustion engine after a startup time and an operating ignition curve for an engine speed range in the normal operation of the internal combustion engine are stored; and
  a processor configured to:
    read a current engine speed and at least one time value which indicates a time that has elapsed since a reference time in relation to the startup time; and
    at least one of determine and initiate a switchover from the starting ignition curve to the operating ignition curve based on the current engine speed and the time value,
  wherein the processor is further configured to repetitively monitor whether both the time value lies above a time threshold value and an engine speed value lies below a speed threshold value,
  the processor only at least one of determines and initiates the switchover when both the time value lies above the time threshold value and the engine speed value lies below the speed threshold value, and
  the time threshold value, which is between 0 and 2000 ms, defines an upper time limit that is required for increasing an engine speed to the speed threshold value.

2. The control device as claimed in claim 1, wherein the starting ignition curve comprises a cut-off, in a form of or by means of an ignition timing retardation, in an upper speed range of the starting ignition curve.

3. The control device as claimed in claim 1, wherein a cut-off of the starting ignition curve comprises a significant downward step of an ignition time in a region directly before reaching a maximum permissible engine speed during starting of the internal combustion engine.

4. The control device as claimed in claim 1, wherein the memory is comprised in the processor.

5. The control device as claimed in claim 4, wherein the reference time follows the startup time and indicates the reaching of an engine speed that is suitable for supplying at least the processor with an operating current.

6. The control device as claimed in claim 1, wherein the processor is further configured to read a first time value and a second time value and to monitor whether the first time value lies above the time threshold value and whether the second time value lies above a second time threshold value, the processor only instigating the switchover when both the first time value lies above the time threshold value and the second time value lies above the second time threshold value.

7. The control device as claimed in claim 6, wherein the time threshold value and the second time threshold value are variable independently of one another, in dependence on a temperature of the internal combustion engine.

8. A method for controlling an operation of an internal combustion engine of a portable work device, the method comprising:
   storing, in a memory, a starting ignition curve for specifying an ignition time after a startup time of the internal combustion engine and an operating ignition curve for specifying the ignition time in a speed range assigned to a nominal operation of the internal combustion engine;
   reading a current engine speed;
   reading at least one time value which indicates a time that has elapsed since a reference time, wherein the reference time relates to the startup time of the internal combustion engine; and
   at least one of determining and initiating, by a processor, a switchover process from the starting ignition curve to the operating ignition curve based on the current engine speed and the time value,
   wherein the processor repetitively monitors whether both the time value lies above a time threshold value and the engine speed value lies below a speed threshold value,
   the processor only at least one of determines and initiates the switchover process when both the time value lies above the time threshold value and the engine speed value lies below the speed threshold value, and
   the time threshold value, which is between 0 and 2000 ms, defines an upper time limit that is required for increasing an engine speed to the speed threshold value.

9. A portable work device, comprising:
   a drive shaft;
   a driven shaft coupled to a power consumer;
   a clutch configured to transmit a torque from the drive shaft to the driven shaft; and
   the control device as claimed in claim 1.

10. The portable work device as claimed in claim 9, wherein the speed threshold value is less than a driver speed of the clutch.

11. The control device as claimed in claim 1, wherein the processor comprises at least one dedicated circuit.

12. The control device as claimed in claim 1, further comprising:
   a nonvolatile memory including software that, when executed by the processor, causes the processor to read the current engine speed and at least one of determine and initiate the switchover.

13. A computer program product, comprising:
   segments of program code for carrying out the method as claimed in claim 8 when running the computer program product on one or more computer devices.

14. The computer program product as claimed in claim 13, wherein the segments of program code are stored on a computer-readable medium.

\* \* \* \* \*